UNITED STATES PATENT OFFICE.

MAX FISCHER, OF BASEL SWITZERLAND ASSIGNOR TO J. R. GEIGY S. A., OF BASEL, SWITZERLAND, A CORPORATION OF SWITZERLAND.

PROCESS OF MAKING 2-AMINOANTHRAQUINONE.

1,340,603.  Specification of Letters Patent.  Patented May 18, 1920.

No Drawing.  Application filed March 8, 1919. Serial No. 281,499.

*To all whom it may concern:*

Be it known that I, MAX FISCHER, chemist, a citizen of the Swiss Republic, and resident of Basel, Switzerland, have invented a new and useful Process of Making 2-Aminoanthraquinone, of which the following is a full, clear, and exact specification.

It is a well-known fact that when the anthraquinone-2-sulfonic acid is treated with ammonia, the yield of 2-aminoanthraquinone increases up to 73.7% in the presence of chlorid of barium, while the yield is 50% only without chlorid of barium. This favorable effect of the chlorid of barium is explained by the slight solubility of the sulfite of barium which prevents the sulfurous acid, that is produced by the reaction, from further influencing the anthraquinone molecule.

The fact might lead to the assumption that an addition of chlorid of calcium in the place of chlorid of barium would have the same favorable effect as to the yield, in consequence of the formation of calcium sulfite of which the solubility is also rather poor. This however is not the case since the yield is then only 60% of the theory.

Now I have made the surprising observation that in the presence of chlorid of calcium the treatment with ammonia leads to a yield of 70 per cent. of the theory if a further quantity of chlorid of sodium is added to the mixture.

Hereby the chlorid of sodium can be replaced partly by chlorid of ammonium or chlorid of magnesium. By substituting for the chlorid of sodium a mixture of chlorid of sodium and of chlorid of magnesium a further slight increase of yield takes place, the yield ascending to about 79.3 per cent. of the theory when the said mixture is formed by equal parts of chlorid of sodium and of chlorid of magnesium.

In order to illustrate the new process more fully the following example is given, the parts being by weight:

100 parts of the sodium salt of anthraquinone-2-sulfonic acid are heated during 7 hours to 205° C. in an autoclave together with 1000 parts of a concentrated aqueous solution of ammonia of about 23%, 60 parts of crystallized chlorid of calcium and 100 parts of sodium chlorid. After cooling down, the contents of the autoclave are filtered off and the red pap-like crystalline mass is boiled out successively with water, diluted hydrochloric acid and a solution of soda. The dried product is the pure 2-aminoanthraquinone. The yield amounts to 50 parts or 70% of the theory.

Instead of sodium chlorid a mixture of sodium chlorid with ammonium chlorid or a mixture of sodium chlorid with magnesium chlorid can be employed.

What I claim is:

1. The herein described process for the manufacture of 2-aminoanthraquinone consisting in heating under superatmospheric pressure anthraquinone-2-sulfonic acid with ammonia in the presence of calcium chlorid and of sodium chlorid.

2. The herein described process for the manufacture of 2-aminoanthraquinone, consisting in heating under superatmospheric pressure anthraquinone-2-sulfonic acid with ammonia in the presence of calcium chlorid, sodium chlorid and magnesium chlorid.

In witness whereof I have hereunto signed my name this 10th day of February, 1919, in the presence of two subscribing witnesses.

MAX FISCHER.

Witnesses:
SCOTT TAGGART,
AMAND RITTER.